(12) United States Patent
Johnson et al.

(10) Patent No.: US 9,872,484 B1
(45) Date of Patent: Jan. 23, 2018

(54) EXPANDABLE SNAG RESISTANT FISH HOOK SYSTEM

(71) Applicants: H. Emery Johnson, Stockbridge, GA (US); Brian D. Taubert, Fayetteville, GA (US); Karl H. Beitzel, Canton, GA (US)

(72) Inventors: H. Emery Johnson, Stockbridge, GA (US); Brian D. Taubert, Fayetteville, GA (US); Karl H. Beitzel, Canton, GA (US)

(73) Assignee: TRIDENT OUTDOORS LLC, McDonough, GA (US)

( * ) Notice: Subject to any disclaimer, the term of this patent is extended or adjusted under 35 U.S.C. 154(b) by 179 days.

(21) Appl. No.: 14/630,351

(22) Filed: Feb. 24, 2015

Related U.S. Application Data

(60) Provisional application No. 61/944,702, filed on Feb. 26, 2014.

(51) Int. Cl.
*A01K 83/02* (2006.01)
*A01K 85/00* (2006.01)

(52) U.S. Cl.
CPC .............. *A01K 83/02* (2013.01); *A01K 85/00* (2013.01)

(58) Field of Classification Search
CPC ................................ A01K 85/02; A01K 83/02
USPC ....................................................... 43/34–37
See application file for complete search history.

(56) References Cited

U.S. PATENT DOCUMENTS

| 454,580 | A | * | 6/1891 | Mack | ..................... | A01K 83/00 |
| | | | | | | 43/35 |
| 679,296 | A | * | 7/1901 | Clark | ..................... | A01K 83/00 |
| | | | | | | 43/42.19 |
| 1,056,397 | A | | 3/1913 | Bonnell | | |
| 1,812,906 | A | * | 7/1931 | Swearingen | .......... | A01K 85/02 |
| | | | | | | 43/35 |
| 2,124,263 | A | * | 7/1938 | Schott | ..................... | A01K 83/02 |
| | | | | | | 43/43.2 |
| 2,256,088 | A | * | 9/1941 | Hogan | ................... | A01K 83/02 |
| | | | | | | 43/35 |

(Continued)

FOREIGN PATENT DOCUMENTS

| DE | 4443291 A1 | * | 6/1996 | ............. | A01K 83/02 |
| FR | 2552973 A1 | * | 4/1985 | ............. | A01K 83/02 |

(Continued)

OTHER PUBLICATIONS

Translation of French Publication No. 2552973.*

*Primary Examiner* — Darren W Ark
(74) *Attorney, Agent, or Firm* — Lee & Hayes, PLLC; Charles L. Warner (57) ABSTRACT

A snag resistant fish hook system. The system (11) having hooks (105A, 105B), an elastic band (110), a connector portion (115) having an eyelet (115A), and a post (125). Each hook has a tab (116), an eyelet (118), and a notch (117). The post fits into the eyelets and secures the hooks and the connector portion together, with at least one of the hooks being rotatable on the post. The elastic band fits around the hooks and into the notches and holds the hooks in a first, retracted, snag-resistant position wherein the tabs contact each other. Upon the application of sufficient force, such as a fish biting a lure in which the fish hook system is employed, the tabs will slip past each other and the elastic band will urge the hooks into a second, deployed position.

8 Claims, 7 Drawing Sheets

(56) References Cited

U.S. PATENT DOCUMENTS

| | | | |
|---|---|---|---|
| 2,445,601 A | 7/1948 | Carlsen et al. | |
| 2,756,478 A * | 7/1956 | Morrissey | A01K 91/03 24/599.5 |
| 2,854,779 A * | 10/1958 | Jackson | A01K 85/02 43/37 |
| 2,881,550 A * | 4/1959 | Newkirk | A01K 83/06 43/35 |
| 3,175,322 A * | 3/1965 | Snyder | A01K 83/02 43/36 |
| 3,331,151 A * | 7/1967 | Turrentine | A01K 83/02 43/43.2 |
| 3,382,602 A * | 5/1968 | Blake | A01K 83/02 43/44.6 |
| 3,483,650 A * | 12/1969 | Weaver | A01K 83/02 43/35 |
| 3,727,340 A * | 4/1973 | Harris | A01K 83/02 43/36 |
| 4,283,877 A * | 8/1981 | Onstott | A01K 83/02 43/34 |
| 4,384,426 A | 5/1983 | Steeve | |
| 4,433,502 A | 2/1984 | Steeve | |
| 4,506,469 A * | 3/1985 | Calagui | A01K 83/02 43/34 |
| 4,934,092 A * | 6/1990 | Simmons | A01K 83/02 43/36 |
| 5,577,340 A * | 11/1996 | Murphy | A01K 85/02 43/34 |
| 5,890,314 A * | 4/1999 | Peters | A01K 85/02 43/35 |
| 6,941,695 B2 * | 9/2005 | Minegar | A01K 85/02 43/34 |
| 7,980,021 B2 * | 7/2011 | Siatkowski | A01K 83/06 43/44.2 |
| 8,020,337 B1 * | 9/2011 | Batton | A01K 83/02 43/36 |
| 8,826,585 B2 | 9/2014 | Park | |
| 9,485,973 B2 * | 11/2016 | Burke | A01K 83/06 |
| 2004/0134118 A1 * | 7/2004 | Miller | A01K 83/02 43/34 |
| 2011/0119984 A1 * | 5/2011 | Tsai | A01K 85/02 43/35 |
| 2013/0047492 A1 | 2/2013 | Frederick | |
| 2013/0133240 A1 | 5/2013 | Beitzel | |
| 2014/0013647 A1 * | 1/2014 | Burke | A01K 83/06 43/4.5 |
| 2016/0143258 A1 * | 5/2016 | Brandt | A01K 97/06 43/35 |

FOREIGN PATENT DOCUMENTS

| | | | |
|---|---|---|---|
| JP | 02092226 A | * | 4/1990 |
| JP | 2003259764 A | * | 9/2003 |
| JP | 2006141388 A | * | 6/2006 |

* cited by examiner

EXPANDABLE SNAG RESISTANT FISH HOOK SYSTEM

CROSS-REFERENCE TO RELATED APPLICATION

This application claims the priority of U.S. Provisional Patent Application No. 61/944,702, filed Feb. 26, 2014, entitled "Expandable Snag Resistant Fish Hook System," the entire disclosure and contents of which are hereby incorporated herein by reference.

BACKGROUND

When a person is fishing, an exposed fish hook getting snagged in cover or structure is often an irritating problem. To avoid this problem, snagless fish hook designs have been invented, such as described in U.S. Pat. Nos. 1,056,397, 2,124,263, 2,445,601, 3,331,151, 3,727,340, 4,384,426, 4,433,502, 5,577,340, and 8,826,585, and in U.S. Patent Publications US2004/0134118A1 and US2013/0047492A1. Conventional hook systems, however, whether of the exposed design or a snag proof design, often create drag or an undesired/unnatural motion of the lure. Some designs also tend to hinder a solid hook set or desired hook penetration. Further, some designs are expensive to manufacture, are difficult to assemble and/or operate, and/or are highly susceptible to malfunctioning due to clogging of the fish hook release mechanism.

BRIEF SUMMARY OF THE DETAILED DESCRIPTION

A hook system has a pair of hooks and a retention and release mechanism. In a first position, at least a portion of the bends of the hooks overlap each other and, in a second position the bends do not overlap each other and the tips of the hooks point outwardly. The retention and release mechanism releasably holds the hooks in the first position. When a sufficient force is applied, such as from a fish biting a lure using the hook system, the force overcomes the retention and release mechanism and allows the hooks to move to the second position.

DETAILED DESCRIPTION

Figure 1:
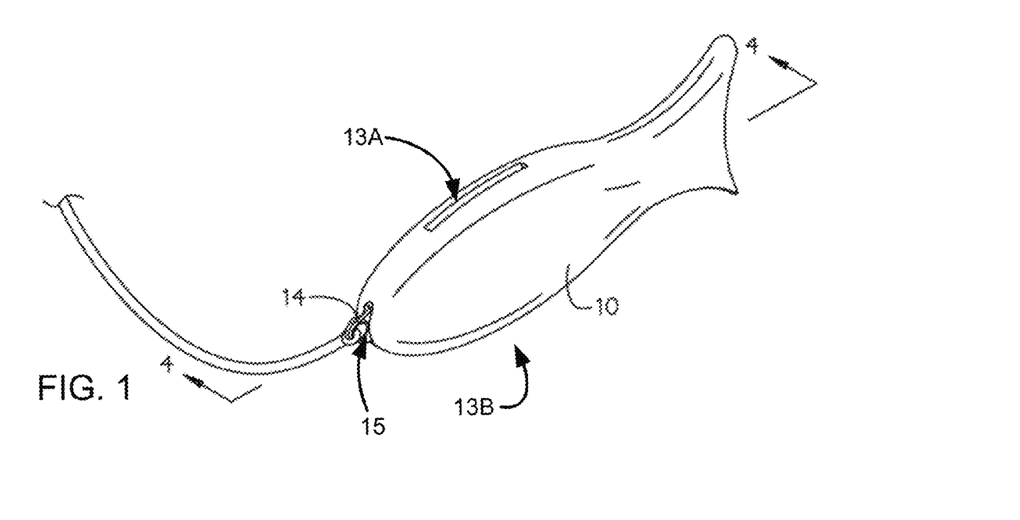
FIG. 1 is an illustration of a containment body with an exemplary fish hook system having a first embodiment of a retainer and release mechanism with the hooks being shown in a retracted position.
Figure 2:
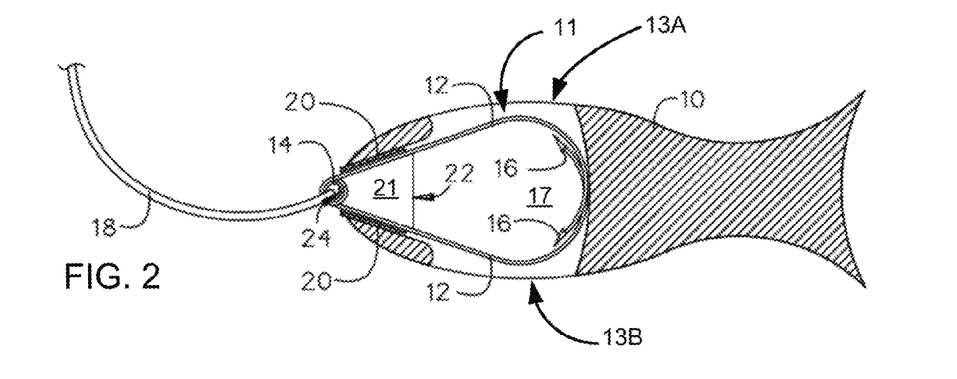
FIG. 2 is a section detail view along line 4-4 in FIG. 1 of the containment body with the exemplary fish hook system having a first embodiment of a retainer and release mechanism with the hooks being shown in the retracted position.

FIG. 1 is an illustration of a containment body 10 with an exemplary fish hook system 11 having a first embodiment of a retainer and release mechanism 20 with the hooks 12 being shown in a retracted position. A containment body 10 may be, but is not limited to, a lure. FIG. 2 is a section detail view along line 4-4 in FIG. 1 of the containment body 10 with the exemplary fish hook system 11 having a first embodiment of a retainer and release mechanism 20 with the hooks 12 being shown in the retracted position. For convenience of discussion herein, the exemplary containment body 10 may sometimes be referred to the body or as the lure without narrowing or limiting the scope. There are preferably at least two slots 13 (slot 13A, slot 13B) and an opening 15 which join together in a cavity 17 in the body 10. The hook system 11 may be inserted into the cavity 17 via one of the slots 13A, 13B. An attachment component 18, such but not limited to monofilament line, braided line, wire, swivel, is preferably attached to a hook eyelet 14 of the hook system 11.

The retention and release mechanism 20 holds the hooks 12 in the retracted position until triggered, at which time the hooks 12 move to the deployed position. The hooks 12, when held in the refracted position, generally point in the direction of each other. Each hook 12 preferably has a barbed hook tip or end 16. The retention and release mechanism 20 is generally in the form of a sleeve 21 having a larger opening 22 through which the hooks 12 extend and a smaller opening 24 through which the eyelet 14 extends.

Figure 3:
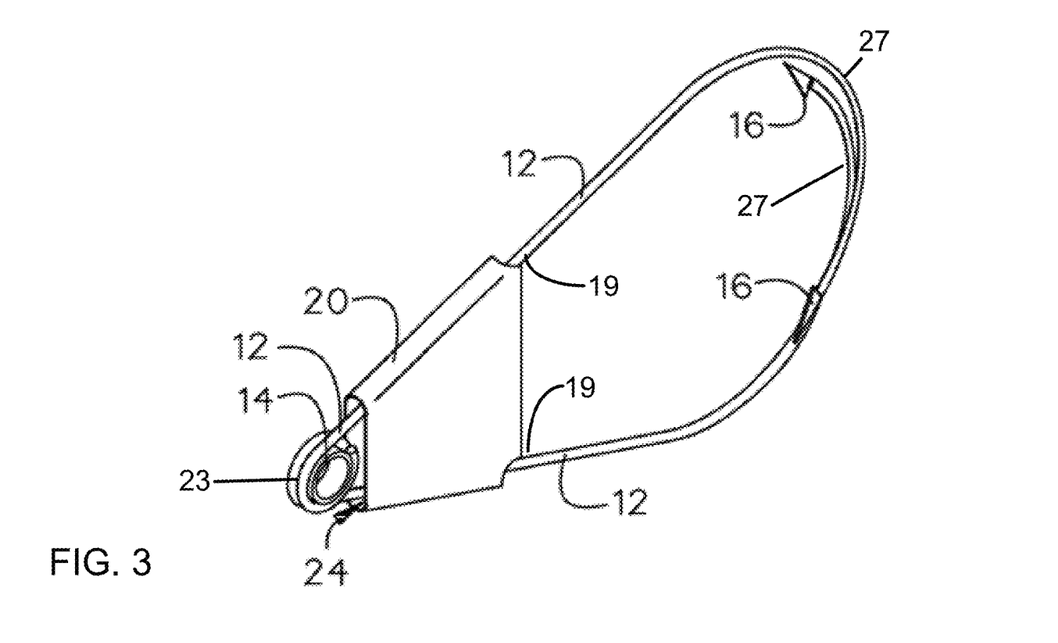
FIG. 3 is an illustration of the first embodiment of the retainer and release mechanism of the exemplary fish hook system of FIG. 1 with the hooks being retracted.
Figure 4:
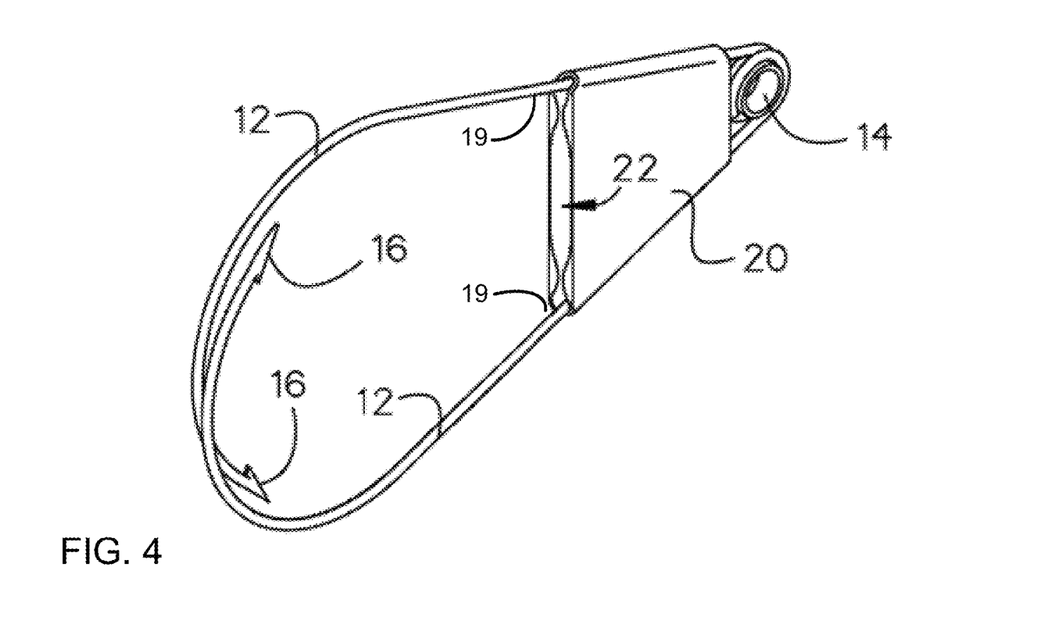
FIG. 4 is another illustration of the first embodiment of the retainer and release mechanism of the exemplary fish hook system of FIG. 1 with the hooks being retracted.

FIG. 3 is an illustration of the first embodiment of the retainer and release mechanism 20 of the exemplary fish hook system 11 of FIG. 1 with the hooks 12 being retracted. As shown in FIG. 3, a hook 12 has a shank 19, a bend 27, and a point or tip 16, which may be a barbed tip. FIG. 4 is another illustration of the first embodiment of the retainer and release mechanism 20 of the exemplary fish hook system 11 of FIG. 1 with the hooks 12 being retracted. FIG. 4 also shows a larger opening 22 and the hooks 12 being in the end channels 30 (retracted position). The hook is curled at the eyelet 14 so as to form as spring 23 which tends to force the shanks (shafts) 19 toward each other, that is, toward the deployed position. The "retracted position" or "deployed position" is determined with respect to the ends of the hooks 12, such as the pointed tips 16, and not with respect to the shanks 19 of the hooks 12.

Figure 5:
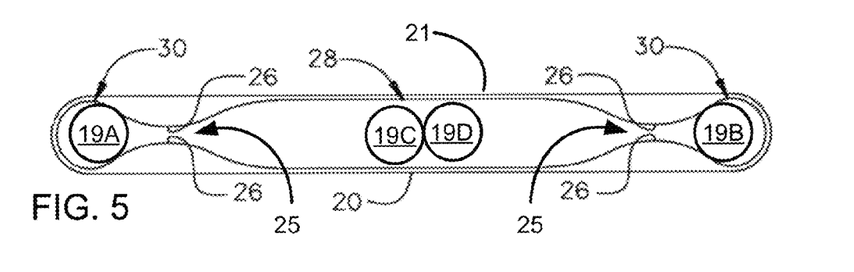
FIG. 5 is an end view illustration of an exemplary sleeve used in the first embodiment of the retainer and release mechanism of the exemplary of the fish hook system.

FIG. 5 is an end view illustration of an exemplary sleeve 21 used in the first embodiment of the retainer and release mechanism 20 of the exemplary of the fish hook system 11. In this embodiment there is the central channel or opening 28 in the middle of the sleeve 21, with an end channel 30 at each end of the sleeve 21. Between the central channel 28 and each end channel 30 there are extensions 26 of the sleeve 21 which form a constricted throat areas 25. Initially, the hooks 12 are held in the retracted position by the extensions 26 and constricted throat areas 25, as shown by the positions of the shanks 19A, 19B of the hooks 12. The resistance provided by the constricted throat areas 25 and extensions 26 is greater than the outward force provided by the spring 23. When pressure is exerted on the hooks 12, such as by the mouth of a fish (not shown) closing on the lure 10, the additional pressure will overcome the resistance of the constricted throat areas 25 and the extensions 26. This forces the shanks 19 inward to the deployed position, as shown by the positions of the shanks 19C, 19D. Attempts by the fish to return the hooks 12 to the retracted position are thwarted by the constricted throat areas 25. A human, however, would have no trouble exerting enough pressure to force the shanks 19 of the hooks 12 back past the constricted throat areas 25 and into the retracted position.

Figure 6:
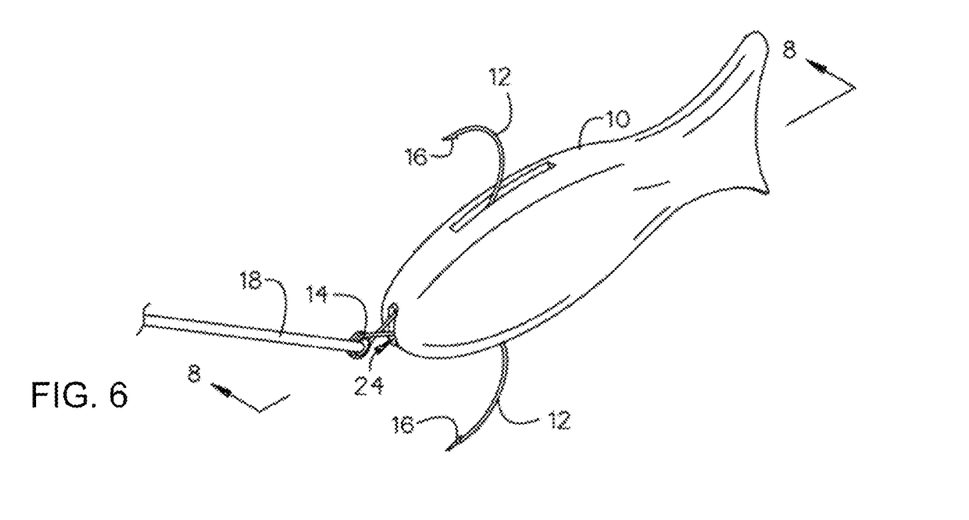
FIG. 6 is another illustration of the containment body of FIG. 1 with the exemplary fish hook system with the hooks being deployed.
Figure 7:
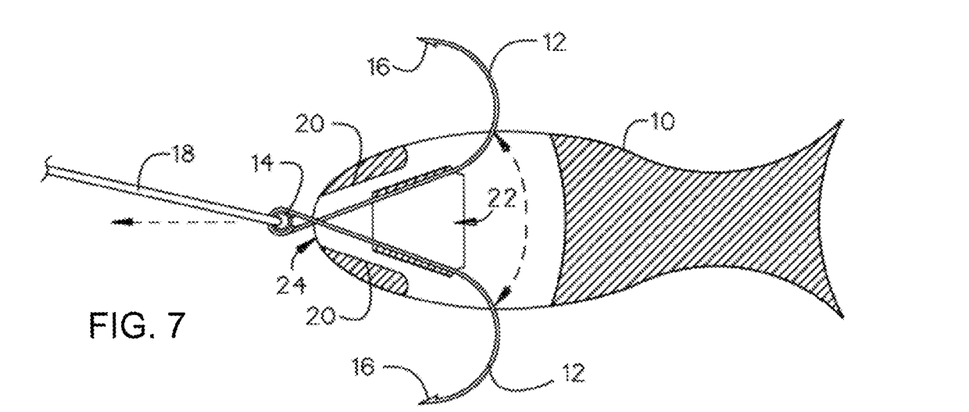
FIG. 7 is a section detail view along line 8-8 in FIG. 6 of the containment body of FIG. 1 with the exemplary fish hook system with the hooks being deployed.

FIG. 6 is another illustration of the containment body 10 of FIG. 1 with the exemplary fish hook system 11 with the hooks 12 being deployed. FIG. 7 is a section detail view along line 8-8 in FIG. 6 of the containment body 10 of FIG. 1 with the exemplary fish hook system 11 with the hooks 2 being deployed.

Figure 8:
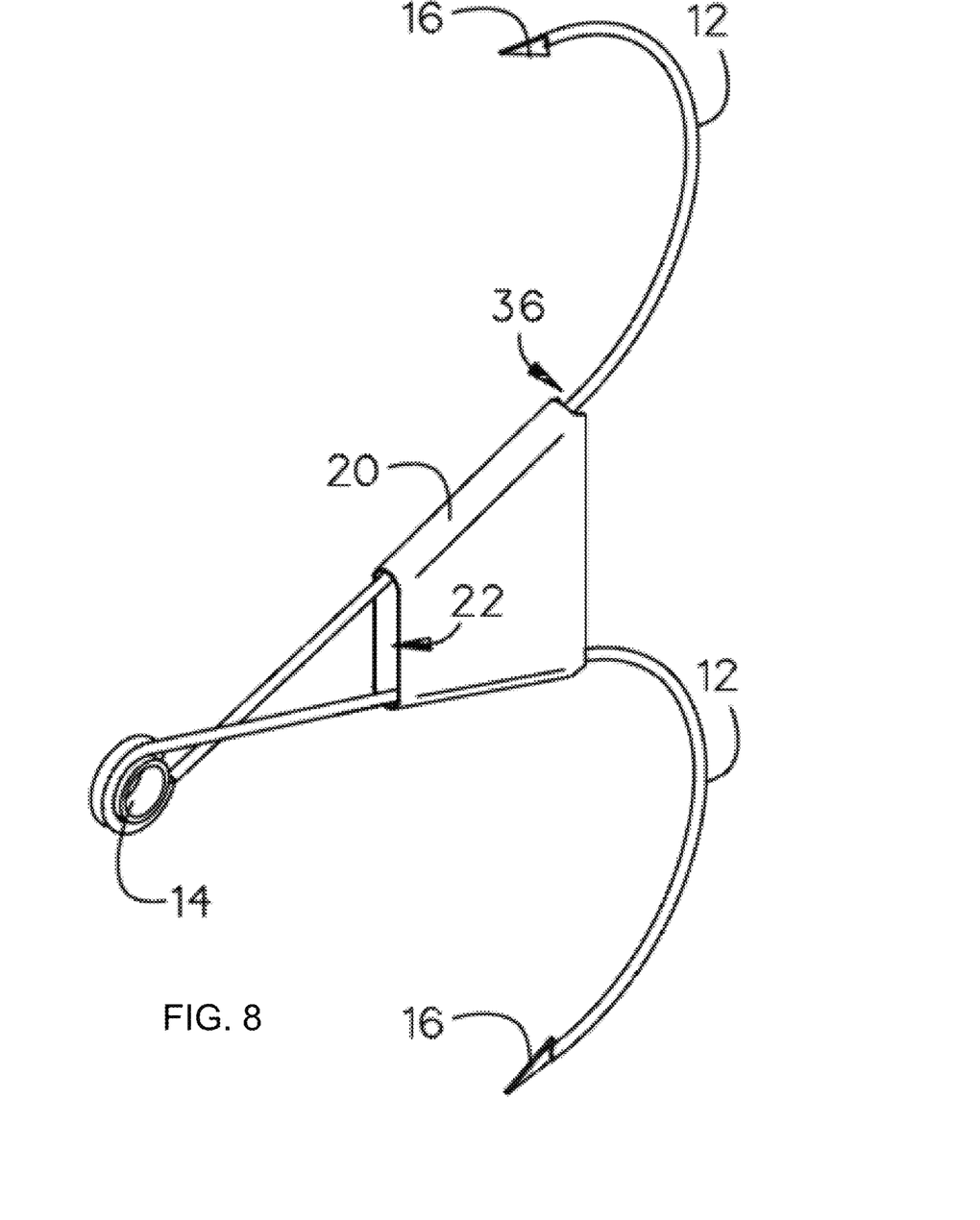
FIG. 8 is a perspective view of the first embodiment of the retainer and release mechanism with the hooks being deployed.
Figure 9:
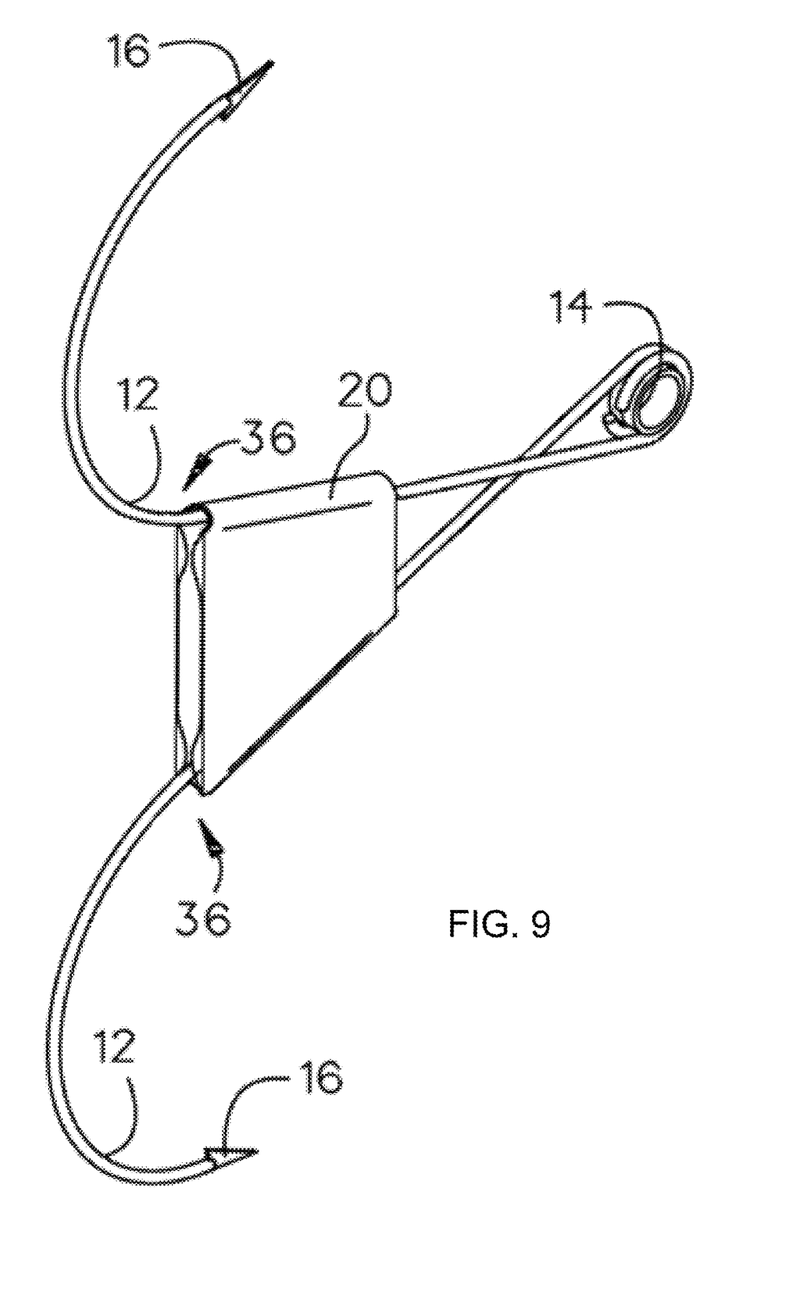
FIG. 9 is another perspective view of the first embodiment of the retainer and release mechanism with the hooks being deployed.

FIG. 8 is a perspective view of the first embodiment of the retainer and release mechanism 20 with the hooks 12 being deployed. FIG. 9 is another perspective view of the first embodiment of the retainer and release mechanism 20 with the hooks 12 being deployed.

The hooks 12 are attached at the hook eyelets 14 in a closed inverted position by one of the attachment components listed above. The modified containment body 10 fits over the sleeve/spring retention device 20. At the closed position the sleeve/spring retention device 20 employs adequate locking resistance to keep the hooks 12 in the snag proof position until adequate resistance is applied through a strike from a fish or hook set by the angler. When adequate resistance is applied, the sleeve/spring retention device 20 allows the hooks 12 to deploy into the fully expanded position. The sleeve/spring retention device 20 then locks the hooks 12 into the fully expanded position allowing for maximum hook set capability and greatly minimizing the potential for failed hook sets while increasing success ratios exponentially.

FIGS. 10A-10D are illustrations of a second embodiment of a retention and release mechanism 100 and the operation thereof. This embodiment has hooks 105 (105A, 105B), an elastic band 110, a connector portion 115, an optional sleeve or skirt 120, and a post 125.

Figures 10A, 10B, 10C, 10D:
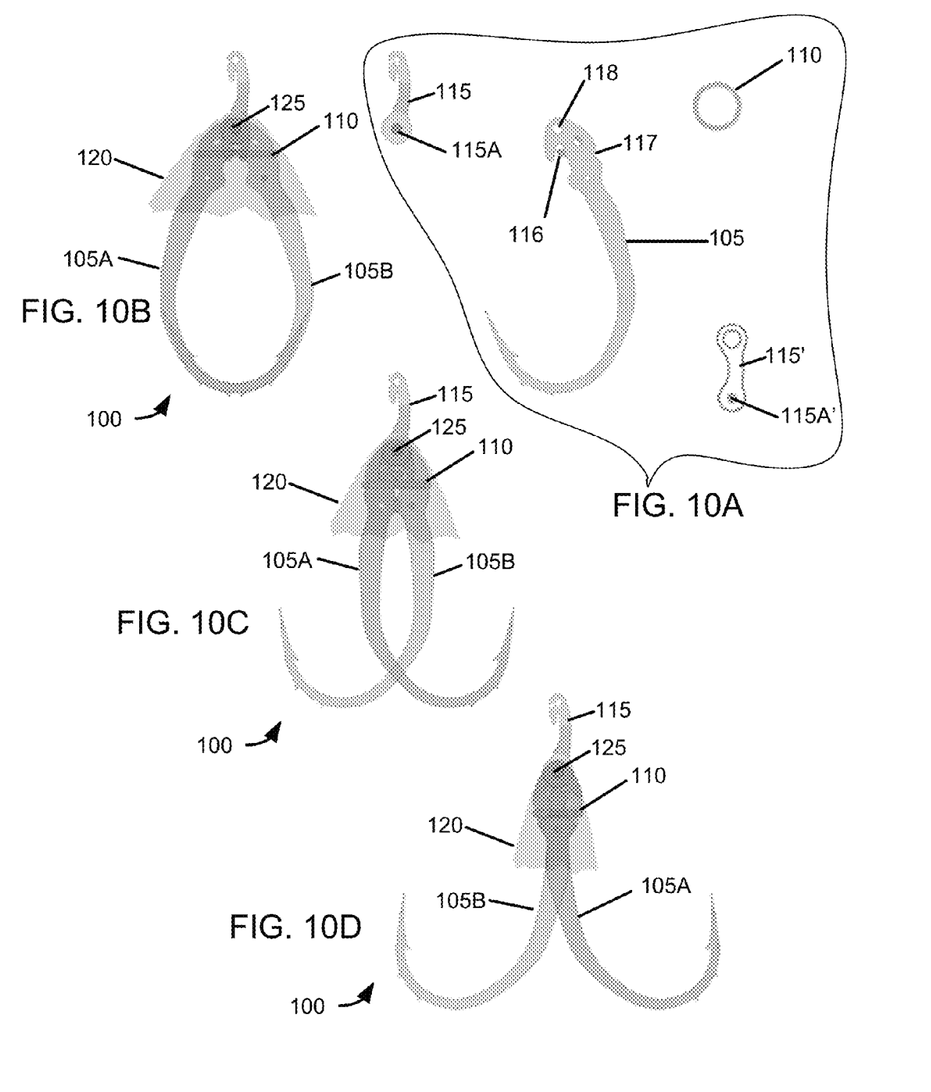
FIGS. 10A-10D are illustrations of a second embodiment of a retention and release mechanism and the operation thereof.

FIGS. 10A and 10B show the components 105, 110, and 115 individually, and also assembled with the sleeve or skirt 120 and post 125. The post 125 fits into a hole (eyelet) 118 of a hook 105 and the hole 115A of the connector 115 to joins the hooks 105A, 105B and connector 115 together. The hooks 105A, 105B and the connector 115 may rotate about the post 125. The post 125 may be, for example, flared on each end after installation so prevent the hooks 105A, 105B and connector 115 from sliding off the post 125. Each hook 105 has a finger (tab, extension) 116 which angles slightly to one side. The finger 116 from one hook 105A then rests against the finger 116 from the other hook 105B. The band 110 sits in a notch (indentation) 117 in each hook 105 and tends to urge the hooks 105A, 105B toward each other but the fingers 116 hold the hooks 105A, 105B initially in the refracted position. When a fish bites the lure 10 the fingers 116 slip past each other, thus allowing the band 110 to urge the hooks 105A, 105B toward each other, that is, toward the deployed position. FIG. 10B shows the fingers 116 initially resting against each other, FIG. 10C shows the fingers 116 slipping past each other (the hooks 105A, 105B are in the process of being deployed), and FIG. 10D shows the hooks 105A, 105B in the deployed position. The hooks 105A, 105B can then be set by the user to the retracted position by simply squeezing the hooks 105A, 105B together until the fingers 116 re-engage.

The sleeve 120 is optional. For example, the sleeve 120 might not be used if the mechanism is inside of a lure 10. The connector portion 115 may be a knotless connector, such as is described in U.S. Patent Publication US2013/0133240A1 by Karl Beitzel for "Line Connector Apparatus And Method", the teachings of which are hereby incorporated herein by reference. A knotless connector is preferred, but is not a requirement. Other types of connectors can also be used, such as, but not limited to, two eyelets, two eyelets joined by a shank, two eyelets joined by a leader, etc. Connector 115' illustrates two eyelets joined by a shank.

FIGS. 11A-11D are illustrations of a third embodiment of a retention and release mechanism 200 and the operation thereof. This embodiment has hooks 205 (205A, 205B), a coil spring 210, and a post 225.

Figure 11A:
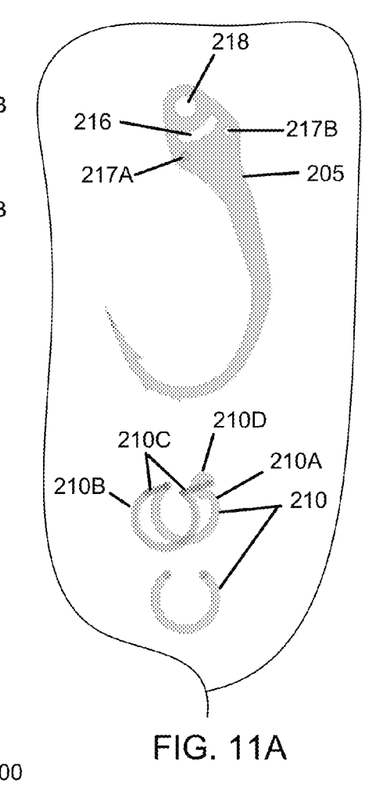
FIGS. 11A-11D are illustrations of a third embodiment of a retention and release mechanism and the operation thereof.
Figure 11B:
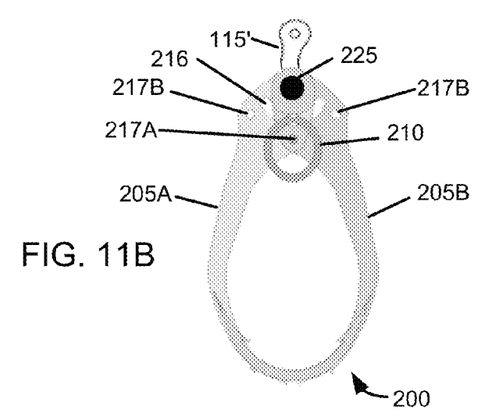

FIGS. 11A and 11B show the components 205 and 210 individually, and also assembled with the post 225. A hook 205 has a slot 216, a boss 217A, a hole (or an indent) 217B which matches the boss 217A of the other hook 205, and a hole 218 for the post 225.

The coil spring 210 is preferably two partial rings or coils 210A, 210B, connected together by extension arms 210C, with a latch 210D. A perspective view showing the two partial rings 210A, 210B, and an end view of the coil spring 210 are shown. The hooks 205A, 205B are placed next to each other, preferably but not necessarily in the deployed position of FIG. 11D, and one coil of the coil spring 210 is inserted through the slots 216. The coil 210 tends to urge the hooks 205A, 205B to the deployed position. The boss 217A of one hook 205 engages the hole 217B of the other hook 205 when the hooks 205A, 205B are in the deployed position and helps to maintain the hooks 205A, 205B in the deployed position. The hooks 205A, 205B are set into the retracted position by the user by simply squeezing the hooks 205A, 205B together until the bosses 217A slide toward and then slightly past each other. The hooks 205A, 205B are then held in the refracted position of FIG. 11A by the force needed to spread the hooks 205A, 205B away from each other (into and out of the page as seen by the viewer) so that the bosses 217A can slide past each other.

Figure 11C:
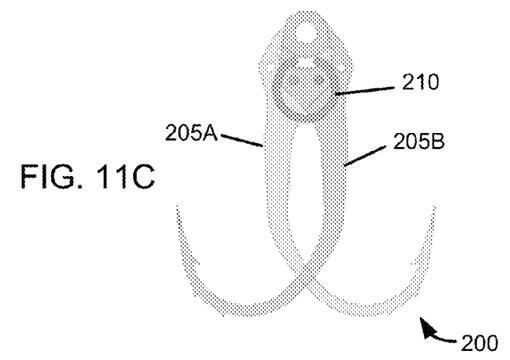
Figure 11D:
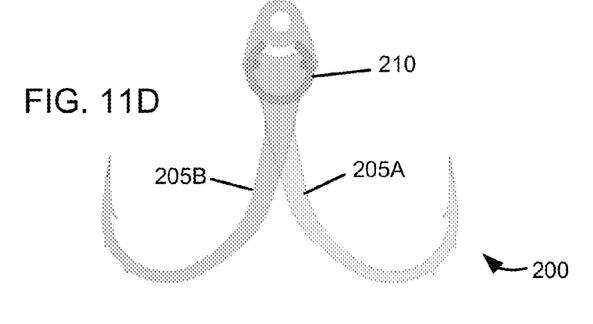

When a fish bites the lure 10 the force of the bite causes the bosses 217A to slip past each other, thus allowing the coil 210 to urge the hooks 205A, 205B toward each other, that is, toward the deployed position. FIG. 11B shows the bosses 217A initially resting against each other, FIG. 11C shows the bosses 217A slipping past each other (the hooks 205A, 205B are in the process of being deployed), and FIG. 11D shows the hooks 205A, 205B in the deployed position with a boss 217A of one hook 205 being in the hole 217B of the other hook. The hooks 205A, 205B can then be set by the user to the retracted position by simply squeezing the hooks 205A, 205B together until the fingers 116 re-engage.

A sleeve or skirt, not shown in FIGS. 11A-11D, but shown as 120 in FIGS. 10B-10D, is optional. The connector may be a knotless connector 115 or another type of connector, such as 115'.

Preferably, but not necessarily, the hooks 12, 105, 205 are laser cut for sharpness and smoothness of operation.

An attachment component 18, such as but not limited to monofilament line, braided line, wire, swivel, etc., is preferably attached to the connector 115, 115'.

A fish strike or hook set will overcome the resistance of the retention and release mechanism 20, 100, 200. This causes the hooks 12, 105, 205 to deploy into the deployed position and to be held or locked in that position. This increases or maximizes hook set effectiveness.

The attachment component 18 may be selected according to the conditions of use, such as the species of fish being sought, or the type of water (pond, stream, gulf) being fished. The size of the hooks 12, 105, 205 may be selected according to the species of fish being sought, including mouth size, and weight.

The system 11 and retention and release mechanisms 20, 100, 200 may also be used for purposes other than fishing. Possible scenarios include: the medical field for retrieval of stints or other internal medical devices, search and rescue missions for hooking sunken items, rock climbing and repelling for hooking and ropes scenarios, dry wall hook or hanging scenarios for decoration or home repair, and/or any other use where it is desirable to place a hook into a desired location while minimizing the likelihood that the hook will catch on an object before reaching the desired position. It will be appreciated that, in some such purposes, it may be desirable that the hooks 12, 105, 205 do not have sharp points, edges, tips, or barbs.

Based on the foregoing, it should be appreciated that technologies for implementing a snag resistant fish hook system, particularly retention and release mechanisms, have been disclosed herein. Although the subject matter presented herein has been described in language specific to the systems, components, and operations, it is to be understood that the concepts disclosed herein are not necessarily limited to the specific systems, components, or operations described herein. Rather, the specific systems, components, and operations are disclosed as example forms. Thus, the subject matter described herein is provided by way of illustration for the purposes of teaching, suggesting, and describing, and not limiting or restricting. Combinations and alternatives to the illustrated embodiments are contemplated, described herein, and set forth in the claims. Various modifications and changes may be made to the subject matter described herein without strictly following the embodiments and applications illustrated and described, and without departing from the scope of the following claims.

The invention claimed is:

1. A hook system comprising:
   a first hook and a second hook, each of the first and second hooks having a shank, a bend on one end of the shank, and a tip on the bend, and having a notch, an eyelet, and a tab on an opposing end of the shank, the tab extending to one side of the shank;
   a connector having an eyelet;
   a post, the post running through the eyelet of the first hook, the eyelet of the second hook, and the eyelet of the connector to secure the first hook, the second hook, and the connector together, wherein at least one of the first hook or the second hook is rotatable on the post;
   an elastic band around the first hook and the second hook and positioned in the notch of the first hook and in the notch of the second hook;
   wherein, in a first position, at least a portion of the bend of the first hook and at least a portion of the bend of the second hook overlay each other, the tab of the first hook and the tab of the second hook releasably engage each other to hold the first hook and the second hook in the first position, the elastic band releasably holding the tab of the first hook in engagement with the tab of the second hook; and
   wherein, upon the application of a sufficient force to the shank of the first hook or the shank of the second hook, the tab of the first hook disengages from and moves past the tab of the second hook and the elastic band urges the bend of the first hook and the bend of the second hook to move toward each other to a second position wherein the bends do not overlap each other and the tips extend outwardly.

2. The hook system of claim 1, wherein, in the first position, the tip and at least a portion of the bend on the one end of the shank of the first hook overlay at least a portion of the bend of the second hook, and the tip and at least a portion of the bend of the second hook overlay at least a portion of the bend of the first hook.

3. The hook system of claim 1, wherein, in the first position:
   the tip of the first hook also overlays the bend of the second hook; and
   the tip of the second hook also overlays the bend of the first hook.

4. The hook system of claim 1 and further comprising a sleeve having a first opening on a smaller end of the sleeve and a second opening on a larger end of the sleeve, the connector extending through the first opening, the first hook and the second hook extending through the second opening.

5. The hook system of claim 4, wherein the post, the eyelet of the connector, the eyelet of the first hook, and the eyelet of the second hook, are within the sleeve.

6. The hook system of claim 1, wherein the post is flared on both ends thereof.

7. The hook system of claim 1 and further comprising a lure, and wherein at least a portion of the connector, the post, at least a portion of the first hook, and at least a portion of the second hook, are contained within the lure.

8. The hook system of claim 1, wherein:
   the tip of the first hook comprises a first barb;
   the tip of the second hook comprises a second barb; and
   in the first position, the first barb overlies at least a portion of the bend of the second hook, and the second barb overlies at least a portion of the bend of the first hook.

\* \* \* \* \*